United States Patent
Miyamoto et al.

(10) Patent No.: US 9,074,579 B2
(45) Date of Patent: Jul. 7, 2015

(54) POWER GENERATOR

(71) Applicant: KABUSHIKI KAISHA YASKAWA DENKI, Kitakyushu-shi (JP)

(72) Inventors: Yasuhiro Miyamoto, Kitakyushu (JP); Shinichi Nishi, Kitakyushu (JP); Masayuki Utsunomiya, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 251 days.

(21) Appl. No.: 13/655,452

(22) Filed: Oct. 19, 2012

(65) Prior Publication Data

US 2013/0270832 A1 Oct. 17, 2013

(30) Foreign Application Priority Data

Apr. 12, 2012 (JP) ................... 2012-091187

(51) Int. Cl.
  *F03D 9/00* (2006.01)
  *F03D 11/00* (2006.01)
  *F03D 11/02* (2006.01)

(52) U.S. Cl.
  CPC ............ *F03D 9/002* (2013.01); *F03D 11/0066* (2013.01); *F03D 11/02* (2013.01); *F05B 2240/61* (2013.01); *F05B 2260/40311* (2013.01); *F05B 2270/326* (2013.01); *Y02E 10/722* (2013.01);
  (Continued)

(58) Field of Classification Search
  CPC ..... F03D 9/002; F03D 11/0066; F03D 11/02; F05B 2240/61; Y02E 10/725
  USPC ....................................... 290/44, 55
  See application file for complete search history.

(56) References Cited

U.S. PATENT DOCUMENTS

| | | | |
|---|---|---|---|
| 7,109,600 B1 * | 9/2006 | Bywaters et al. | 290/55 |
| 8,057,174 B2 * | 11/2011 | Scholte-Wassink | 416/35 |
| 8,358,029 B2 * | 1/2013 | Burkart | 290/55 |

(Continued)

FOREIGN PATENT DOCUMENTS

| | | |
|---|---|---|
| CN | 101493080 | 7/2009 |
| CN | 101868621 | 10/2010 |

(Continued)

OTHER PUBLICATIONS

Japanese Office Action for corresponding JP Application No. 2012-091187, Jan. 14, 2014.

(Continued)

*Primary Examiner* — Pedro J Cuevas
*Assistant Examiner* — Viet Nguyen
(74) *Attorney, Agent, or Firm* — Mori & Ward, LLP (57) ABSTRACT

A power generator according to an embodiment includes a hollow shaped speed-increasing gear, a hollow shaped power generation unit, a rotor shaft, and a position detector. With the input shaft and the output shaft of the hollow shaped speed-increasing gear coaxially disposed with a propeller shaft, and coupled to the propeller shaft. With the input shaft of the power generation unit coaxially disposed with the speed-increasing gear, the power generation unit generates power through the output of the speed-increasing gear. The rotor shaft is coaxially disposed with the speed-increasing gear and the power generation unit and rotates integrally with a propeller while being provided in hollow portions of the speed-increasing gear and the power generation unit. The position detector detects a rotational position of the propeller by detecting the rotational position of the rotor shaft.

14 Claims, 4 Drawing Sheets

(52) U.S. Cl.
CPC .............. *Y02E 10/725* (2013.01); *Y02E 10/721* (2013.01); *F05B 2250/311* (2013.01)

(56) References Cited

U.S. PATENT DOCUMENTS

| | | | |
|---|---|---|---|
| 8,604,636 B2 * | 12/2013 | Miyamoto et al. | 290/55 |
| 2009/0186740 A1 | 7/2009 | Saenz De Ugarte et al. | |
| 2009/0315329 A1 * | 12/2009 | Duffey et al. | 290/44 |
| 2010/0133854 A1 * | 6/2010 | Jansen et al. | 290/1 C |
| 2010/0207396 A1 * | 8/2010 | Simon | 290/55 |
| 2010/0301607 A1 | 12/2010 | Morimoto | |
| 2011/0049886 A1 * | 3/2011 | Becker et al. | 290/44 |
| 2011/0068583 A1 | 3/2011 | Burkart | |
| 2012/0032440 A1 * | 2/2012 | Schindele et al. | 290/7 |
| 2013/0300125 A1 * | 11/2013 | Ruschoff et al. | 290/55 |

FOREIGN PATENT DOCUMENTS

| | | | | |
|---|---|---|---|---|
| DE | 102007060985 | 6/2009 | | |
| JP | 09-093864 | 4/1997 | | |
| JP | 2009-162057 | 7/2009 | | |
| JP | 2011-132929 | 7/2011 | | |
| JP | 2011-208635 | 10/2011 | | |
| WO | WO 2010069456 A2 * | 6/2010 | ................ | H02P 9/10 |

OTHER PUBLICATIONS

Korean Office Action for corresponding KR Application No. 10-2012-0115329, Aug. 31, 2014.
Extended European Search Report for corresponding EP Application No. 12188916.6-1610, Jul. 24, 2014.
Chinese Office Action for corresponding CN Application No. 201210396264.1, Jan. 29, 2015.

* cited by examiner

POWER GENERATOR

CROSS-REFERENCE TO RELATED APPLICATION

This application is based upon and claims the benefit of priority of the prior Japanese Patent Application No. 2012-091187, filed on Apr. 12, 2012, the entire contents of which are incorporated herein by reference.

FIELD

The embodiments discussed herein are directed to a power generator.

BACKGROUND

Power generators using propellers have been known that generate power by the propellers rotated by fluids such as wind and ocean currents. For example, in wind power generators, power generation units convert mechanical energy of the propellers rotated by wind into electrical energy.

Some power generators using propellers include position detectors such as encoders that detect rotational positions of the propellers. An example of related art power generators includes such a position detector attached to a propeller shaft and the position detector detects the rotational position of the propeller by detecting the rotational position of the propeller shaft (e.g., refer to Japanese Patent Application Laid-open No. 2011-208635).

SUMMARY

A power generator according to an aspect of the embodiments includes a hollow shaped speed-increasing gear, a hollow shaped power generation unit, a rotor shaft, and a position detector. With the input shaft and the output shaft of the speed-increasing gear coaxially disposed with a propeller shaft, and coupled to the propeller shaft. With the input shaft of the power generation unit coaxially disposed with the speed-increasing gear, the power generation unit generates power through the output of the speed-increasing gear. The rotor shaft is coaxially disposed with the speed-increasing gear and the power generation unit, and rotates integrally with the propeller while being provided in hollow portions of the speed-increasing gear and the power generation unit. The position detector detects the rotational position of the propeller by detecting the rotational position of the rotor shaft.

BRIEF DESCRIPTION OF DRAWINGS

A more complete appreciation of the invention and many of the attendant advantage thereof will be readily obtained as the same becomes better understood by reference to the following detailed description when considered in connection with the accompanying drawings, wherein.

DESCRIPTION OF EMBODIMENTS

Embodiments of a power generator are described in detail below with reference to the accompanying drawings. In the following embodiments, the power generator is applied to a wind power generator. The power generator, however, can also be applied to a power generator using a propeller other than the wind power generator. For example, the power generator can be applied to a tidal power generator that generates power using a propeller rotated by ocean currents.

Figure 1:
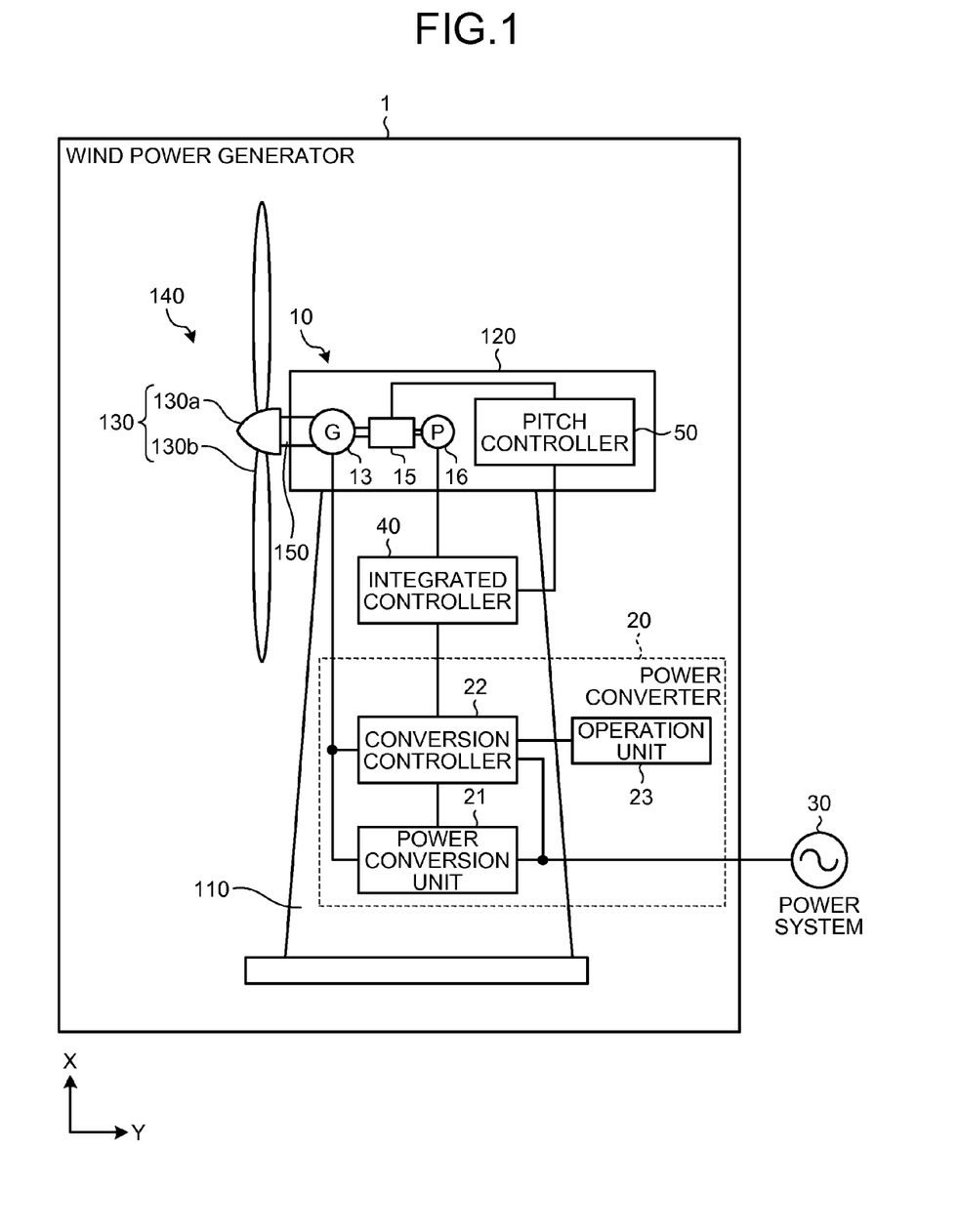
FIG. 1 is a schematic diagram illustrating a structure of a wind power generator according to a first embodiment.

FIG. 1 is a schematic diagram illustrating a structure of a wind power generator according to a first embodiment. As illustrated in FIG. 1, a wind power generator 1 includes a wind power generation unit 10 and a power converter 20, and supplies power to a power system 30. In FIG. 1, some components are omitted from illustration for the sake of easy explanation. In the following description, X and Y axes that are orthogonal to each other are set to clearly describe a positional relationship, and the positive direction of the X axis is defined as an upward vertical direction.

The wind power generation unit 10 includes a tower body 110, and a windmill 140 having a nacelle 120 and a propeller 130. The propeller 130 includes a hub 130a and a plurality of blades 130b attached to different positions of the hub 130a.

The blades 130b are provided such that their pitch angles can be changed. The pitch angle is defined as an angle made between a rotational plane of the propeller 130 and a chord of the blade 130b. The smaller the pitch angle is, the larger a wind receiving area of the blade 130b is. In other words, drag of wind on the blade 130b increases, thereby enabling more energy to be generated by wind.

The nacelle 120 is supported by the tower body 110 in a rotatable manner. The nacelle 120 houses therein a power generation unit 13 that is connected to the propeller 130 through a propeller shaft 150. The power generation unit 13 is a rotating electrical machine that can also be used as an electrical motor. For example, the power generation unit 13 is a permanent magnet rotating electrical machine. The propeller shaft 150 is connected to the hub 130a of the propeller 130.

Power generated by the power generation unit 13 is output to the power converter 20 and subjected to power conversion performed by the power converter 20. Thereafter, converted power is supplied to the power system 30. A structure and operation of the power converter 20 are described later.

The nacelle 120 further houses therein a position detector 16 that detects the rotational position of the propeller 130 rotated by wind. In the first embodiment, the position detector 16 is an absolute value encoder. The absolute value encoder detects an absolute position. The absolute value encoder can therefore detect the current rotational position of the propeller 130 without performing origin return operation even when the propeller 130 is rotated by strong wind, for example, during stoppage of the power source.

The rotational position of the propeller 130 detected by the position detector 16 is output to a pitch controller 50 through an integrated controller 40. Upon acquiring the rotational position of the propeller 130 through the integrated controller 40, the pitch controller 50 performs pitch control processing that changes the pitch angle of the blade 130b for each blade 130b in accordance with the rotational position of the propeller 130. Specific operations of the integrated controller 40 and the pitch controller 50 are described later.

In many cases, the propeller shaft is formed to have a large shaft diameter from the viewpoint of strength or power generation efficiency. Accordingly, when a position detector for detecting the rotational position of the propeller is attached to the propeller shaft and the position detector detects the rotational position of the propeller by detecting the rotational position of the propeller shaft, the size of the position detector may increase.

In addition, when the position detector is attached to the propeller shaft having a large shaft diameter, a large mechanical stress may be applied to the position detector because transmissive torque increases as the shaft diameter increases.

In the propeller 130, devices, such as a pitch driving unit that changes the pitch angles of the blades 130*b* by driving the blades 130*b*, are provided. In the nacelle 120, a slip ring 15 is provided that supplies power to the devices, for example.

Specifically, the wind power generator 1 includes a rotor shaft that is connected to the propeller 130, and in which wiring lines from the propeller 130 are provided, and to which the slip ring 15 is attached. The slip ring 15 includes a rotation unit to which the wiring lines from the propeller 130 are connected and a fixed unit that is electrically connected to the rotation unit. The wiring lines from the propeller 130 are connected to external wiring lines through the rotation unit and the fixed unit of the slip ring 15. As a result, power and signals can be exchanged between the devices that are provided in the propeller 130 and rotated together with the propeller 130, and external devices, which are not rotated.

In this way, the wind power generator 1 includes the rotor shaft integrally rotating with the propeller 130 besides the propeller shaft 150. In the wind power generator 1 according to the first embodiment, the position detector 16 detects the rotational position of the propeller 130 by detecting the rotational position of the rotor shaft.

The rotor shaft has a smaller shaft diameter than that of the propeller shaft 150, thereby enabling the position detector 16 to be further downsized than in a case in which the position detector 16 is attached to the propeller shaft 150 for detecting the rotational position of the propeller shaft 150, and additionally enabling a mechanical stress applied to the position detector 16 to be reduced.

Figure 2:
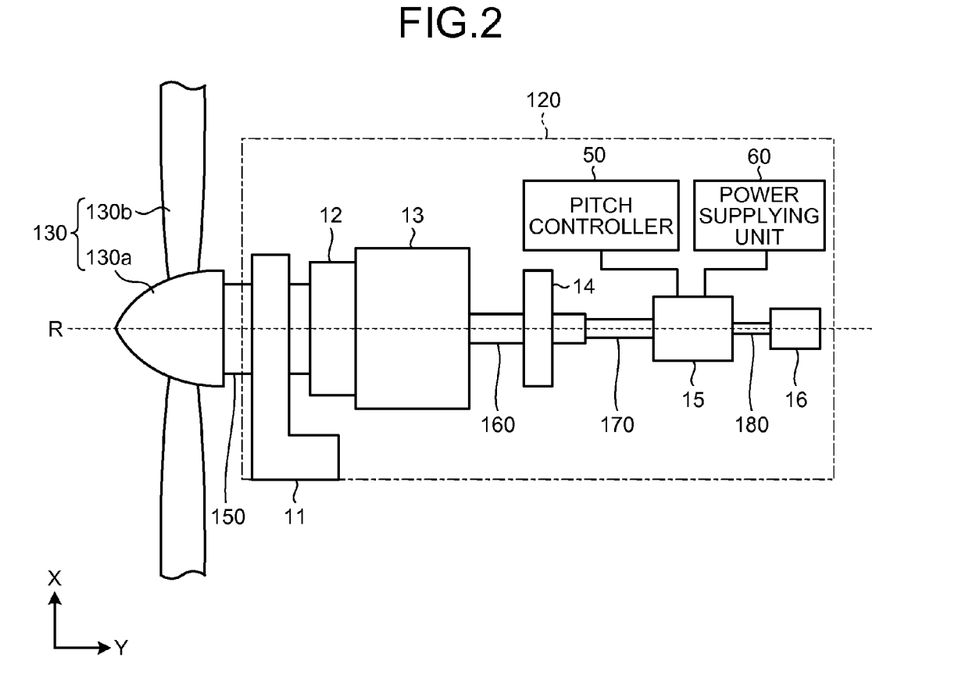
FIG. 2 is a schematic side view illustrating a structure of devices disposed in a nacelle.

A disposition and a connection relationship of the position detector 16 are specifically described below. FIG. 2 is a schematic side view illustrating a structure of devices disposed in the nacelle 120.

As illustrated in FIG. 2, in the nacelle 120, a bearing 11, a speed-increasing gear 12, a break 14, an output shaft 160, a rotor shaft 170, and a detection shaft 180 are provided in addition to the power generation unit 13, the slip ring 15, and the position detector 16.

The bearing 11, the speed-increasing gear 12, the power generation unit 13, the break 14, the slip ring 15, and the position detector 16 are disposed in this order from a position adjacent to the propeller 130. In the following description, a side on which the propeller 130 is provided is referred to as a front of the wind power generator 1 while a side on which the position detector 16 is provided is referred to as a backward of the wind power generator 1.

In the wind power generator 1 according to the first embodiment, the input and output shafts of the speed-increasing gear 12, the input shaft of the power generation unit 13, the rotor shaft 170, and the detection shaft 180 are disposed in such a manner that their central axes coincide with a central axis R of the propeller shaft 150 (i.e., the rotational axis line of the propeller 130). Such an alignment is also described that they are coaxially disposed with the propeller shaft 150. This alignment enables the nacelle 120 housing the above-described devices to be further downsized.

The bearing 11 is a member that supports the propeller shaft 150 in a rotatable manner using a roller bearing, for example. The speed-increasing gear 12, whose input shaft is connected to the propeller shaft 150, increases rotation of the propeller shaft 150 and outputs the increased rotation. The input and output shafts of the speed-increasing gear 12 are disposed on the same axis line as the central axis R of the propeller shaft 150 (coaxially disposed with the propeller shaft 150).

In the first embodiment, the output shaft 160 illustrated in FIG. 2 corresponds to the output shaft of the speed-increasing gear 12. That is, in the first embodiment, the output shaft 160 of the speed-increasing gear 12 doubles as the input shaft of the power generation unit 13, penetrates the power generation unit 13, and extends to the backward of the power generation unit 13. The structure of the output shaft of the speed-increasing gear 12 is not limited to this example. The output shaft of the speed-increasing gear 12 and the input shaft of the power generation unit 13 may be individually formed.

The power generation unit 13 generates power through the output of the speed-increasing gear 12. Specifically, the power generation unit 13 converts rotational energy input from the output shaft 160 of the speed-increasing gear 12 into electrical energy. In the same manner as the speed-increasing gear 12, the input shaft of the power generation unit 13 (i.e., the output shaft 160) is coaxially disposed with the propeller shaft 150. Specific structures of the speed-increasing gear 12 and the power generation unit 13 are described later with reference to FIG. 4.

The break 14, which is provided to a portion of the output shaft 160 extending to the backward of the power generation unit 13, stops the rotation of the output shaft 160 by friction generated by making contact with the output shaft 160, thereby stopping the rotation of the propeller 130. The break 14 is operated in accordance with a command from the integrated controller 40 (refer to FIG. 1), for example.

Figure 3:
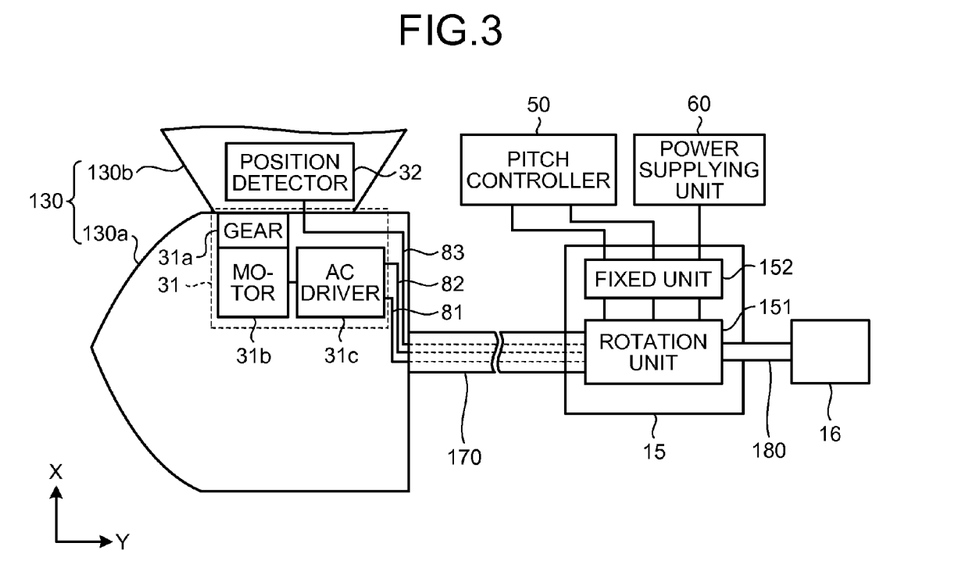
FIG. 3 is a schematic diagram illustrating a connection relationship between a propeller and a slip ring.

The slip ring 15 is an electrical collector that exchanges power and signals between the devices such as the pitch driving unit disposed in the propeller 130 and the external devices, and is connected to the propeller 130 through the rotor shaft 170. A connection relationship between the propeller 130 and the slip ring 15 is described below with reference to FIG. 3. FIG. 3 is a schematic diagram illustrating the connection relationship between the propeller 130 and the slip ring 15.

In FIG. 3, only one of the blades 130*b* is illustrated for the sake of easy explanation. In FIG. 3, only the devices and wiring lines provided corresponding to the blade 130*b* are illustrated, and the devices and wiring lines provided corresponding to the other blades 130*b* are omitted.

As illustrated in FIG. 3, in the hub 130*a* of the propeller 130, a pitch driving unit 31 is provided that changes the pitch angles of the blades 130*b* in accordance with a command from the pitch controller 50. In the blade 130*b*, a position detector 32 is provided.

The pitch driving unit 31 includes a gear 31*a*, a motor 31*b*, and an alternate-current (AC) driver 31*c*. In the pitch driving unit 31, the AC driver 31*c* drives the motor 31*b* so as to rotate the gear 31*a*, thereby rotating the blade 130*b* connected to the gear 31*a*. As a result, the pitch angle of the blade 130*b* is changed. The position detector 32, which is an absolute value encoder, for example, detects the current pitch angle of the blade 130*b* and outputs the detected pitch angle to the pitch controller 50.

The AC driver 31*c* is provided with a power supplying cable 81 and a signal line 82. The position detector 32 is provided with a signal line 83. The power supplying cable 81 and the signal lines 82 and 83 are connected to a rotation unit 151 of the slip ring 15.

On the other hand, the pitch controller 50 and a power supplying unit 60 are connected to a fixed unit 152 of the slip ring 15. The fixed unit 152 maintains electrical connection with the rotation unit 151 while the rotation unit 151 is being rotated together with the propeller 130.

As a result, the pitch driving unit 31 and the position detector 32 that are disposed in the propeller 130 are electrically connected to the pitch controller 50 and the power supplying unit 60 through the rotation unit 151 and the fixed unit 152 of the slip ring 15. The specific structure of the slip ring 15 is described with reference to FIG. 5.

The pitch controller 50 acquires the pitch angle of the blade 130b from the position detector 32 through the signal line 83 and the slip ring 15, and transmits a control signal to the AC driver 31c through the slip ring 15 and the signal line 82. The power supplying unit 60 supplies power to the AC driver 31c through the slip ring 15 and the power supplying cable 81.

In this way, the slip ring 15 can electrically connect the pitch driving unit 31 and the position detector 32 that are disposed on a rotation side to the pitch controller 50 and the power supplying unit 60 that are disposed on a fixed side.

As illustrated in FIG. 3, the power supplying cable 81 and the signal lines 82 and 83 are provided in the rotor shaft 170 and connected to the rotation unit 151 of the slip ring 15. The rotor shaft 170 is coaxially disposed with the propeller shaft 150 (refer to FIG. 2). One end of the rotor shaft 170 is fixed to the propeller 130 and the other end thereof is connected to the rotation unit 151 of the slip ring 15.

That is, the rotation unit 151 of the slip ring 15 is connected to the propeller 130 through the rotor shaft 170. As a result, the rotation unit 151 rotates integrally and coaxially with the propeller 130.

In the wind power generator 1 according to the first embodiment, the detection shaft 180 is provided on a back-end side of the rotation unit 151 of the slip ring 15, and the position detector 16 detects the rotational position of the propeller 130 by detecting the rotational position of the detection shaft 180.

The detection shaft 180 can be formed as a solid shaft because no wiring lines from the propeller 130 need to be provided therein unlike the rotor shaft 170. As a result, the detection shaft 180 can be formed to have a smaller shaft diameter than that of the rotor shaft 170 while maintaining the same strength as the rotor shaft 170. In the wind power generator 1 according to the first embodiment, because the position detector 16 is provided to the detection shaft 180 having a smaller shaft diameter than that of the rotor shaft 170, the position detector 16 can be further downsized and additionally a mechanical stress applied to the position detector 16 can be further reduced.

As illustrated in FIG. 3, the position detector 16 is connected to the propeller 130 without a varying speed mechanism such as the speed-increasing gear or a speed reducer interposed therebetween, i.e., through only the shaft rotating at the same rotational speed as the propeller 130. As a result, the position detector 16 can detect the rotational position of the propeller 130 with high accuracy.

Figure 4:
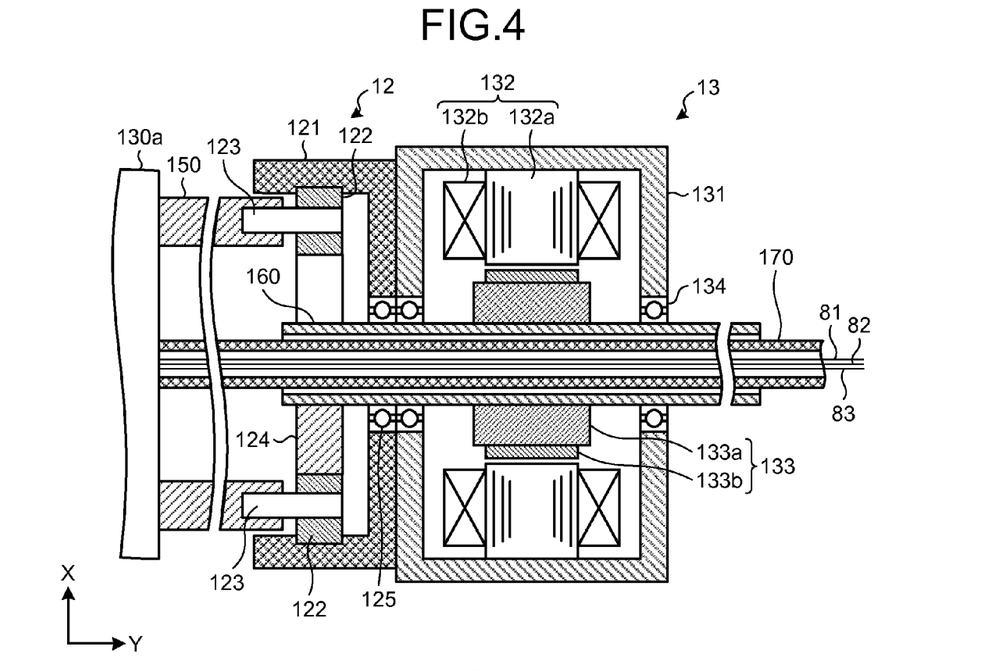
FIG. 4 is a schematic sectional side view of a speed-increasing gear and a power generation unit.

The connection relationship between the position detector 16 and the propeller 130 is more specifically described below with reference to the specific structures of the speed-increasing gear 12, the power generation unit 13, the slip ring 15, and the like. First, the connection relationship between the rotor shaft 170 and the propeller 130 is described with reference to FIG. 4. Then, the connection relationship between the rotor shaft 170 and the position detector 16 is described with reference to FIG. 5. FIG. 4 is a schematic sectional side view of the speed-increasing gear 12 and the power generation unit 13.

As illustrated in FIG. 4, the propeller shaft 150 is a hollow member with both ends open. The propeller shaft 150 is connected to the hub 130a of the propeller 130 at the front end thereof and rotates together with the propeller 130. The propeller shaft 150 transmits the rotation of the propeller 130 to the input shaft of the speed-increasing gear 12, and is in this embodiment defined as the propeller shaft with one end of the propeller shaft 150 connected to the hub 130a and the other end thereof connected to the input shaft of the speed-increasing gear 12.

The speed-increasing gear 12 includes a frame 121 formed in a tubular shape, and a ring 122, a connection shaft 123, a planetary gear 124, and a bearing 125 in the frame 121. The frame 121 is fixed to the nacelle 120 by a supporting post (not illustrated), for example.

The ring 122 is the input shaft of the speed-increasing gear 12. The ring 122 is fixed to the propeller shaft 150 through the connection shaft 123 and the central axis of the ring 122 coincides with the central axis R of the propeller shaft 150 (refer to FIG. 2). The ring 122 is fitted in a groove provided on an inside of the frame 121 in a rotatable manner. The planetary gear 124 is disposed between an inner circumferential surface of the ring 122 and an outer circumferential surface of the output shaft 160 in a rotatable manner.

The output shaft 160, which serves as the output shaft of the speed-increasing gear 12, has a smaller shaft diameter than that of the propeller shaft 150 and the central axis of the output shaft 160 coincides with the central axis of the propeller shaft 150. The output shaft 160 is supported by the bearing 125 fixed to the frame 121 in a rotatable manner.

In the speed-increasing gear 12 thus structured, the ring 122 rotates as the hub 130a of the propeller 130 rotates. As the ring 122 rotates, the planetary gear 124 revolves around the output shaft 160 while rotating. As the planetary gear 124 revolves around the output shaft 160, the output shaft 160 rotates.

In this way, the speed-increasing gear 12 increases the rotation of the propeller shaft 150 (i.e., the rotation of the propeller 130) and outputs the increased rotation as the rotation of the output shaft 160. As a result, the output shaft 160 rotates at a higher rotational speed than that of the propeller 130.

In the first embodiment, the speed-increasing gear 12 includes the planetary gear train only in a single stage. The speed-increasing gear 12 may include the planetary gear train in multiple stages. The planetary gear trains provided in multiple stages can rotate the output shaft 160 at a higher speed increasing ratio.

In the first embodiment, the speed-increasing gear 12 is a planetary gear. The speed-increasing gear 12, however, is not limited to the planetary gear. For example, the speed-increasing gear 12 may be a planetary roller. The planetary gear train or the planetary roller train enables load to be dispersed on the gear or the roller, thereby resulting in relatively less occurrence of wear and chipping. Therefore, the speed-increasing gear 12 including the planetary gear train or the planetary roller train can enhance reliability of the wind power generator 1.

In addition, the planetary gear type speed increasing gear enables the input and output shafts thereof to be coaxially disposed with each other. As a result, the speed-increasing gear 12 including only the planetary gear train or the planetary roller train enables the propeller shaft 150, the speed-increasing gear 12, the power generation unit 13, the slip ring 15, and the position detector 16 to be coaxially disposed. Furthermore, as described later, the rotor shaft 170 coaxially disposed with the propeller shaft 150 can be provided in a hollow portion of the output shaft 160 and connected to the propeller 130.

In the first embodiment, the propeller shaft 150 is connected to the ring 122. The propeller shaft 150, however, may be connected to the planetary gear 124 through the connection shaft. In such a case, the planetary gear 124 is the input shaft of the speed-increasing gear 12.

The power generation unit 13 generates power by the rotation of the output shaft 160. The power generation unit 13 includes a frame 131, a stator 132, a rotator 133, and bearings 134.

The frame 131 is formed in a tubular shape and fixed to the nacelle 120 by a supporting post (not illustrated), for example. The bearings 134, which are fixed to the frame 131, support the output shaft 160 in a rotatable manner.

In the first embodiment, the output shaft 160 extends beyond the power generation unit 13 for attaching the break 14 thereto. The output shaft 160, however, is not always required to extend beyond the power generation unit 13. In such a case, the break is provided to the propeller shaft 150 in the wind power generator 1, and the propeller 130 may be stopped by stopping the rotation of the propeller shaft 150 using the break.

The stator 132 is fixed to an inner circumference of the frame 131 of the power generation unit 13. The stator 132 includes a stator core 132a and a stator winding 132b. The rotator 133 is disposed on an inner circumference side of the stator 132 so as to face the stator 132 with a gap interposed therebetween. The rotator 133 includes a rotator core 133a that has a tubular shape and is provided on the outer circumferential surface of the output shaft 160 and a plurality of permanent magnets 133b arranged on an outer circumference side of the rotator core 133a, and coaxially rotates with the output shaft 160.

In the power generation unit 13 thus structured, the rotator 133 rotates as the output shaft 160 rotates, resulting in a current being generated in the stator winding 132b of the stator 132.

The frame 131 of the power generation unit 13 is fixed to the frame 121 of the speed-increasing gear 12. That is, the frame 131 of the power generation unit 13 and the frame 121 of the speed-increasing gear 12 are integrated. In other words, the output shaft 160, which serves as the output shaft of the speed-increasing gear 12 and the input shaft of the power generation unit 13, is not exposed outside from the speed-increasing gear 12 to the power generation unit 13 (i.e., the output shaft 160 is covered by the frames 121 and 131).

The integration of the power generation unit 13 and the speed-increasing gear 12, i.e., the formation of the power generation unit 13 as the power generator having the speed-increasing gear, enables the nacelle 120 housing the power generation unit 13 and the speed-increasing gear 12 to be downsized.

The output shaft 160, which is the hollow member with both ends open, is coaxially disposed with the propeller shaft 150 as described above. In the wind power generator 1 of the first embodiment, the rotor shaft 170 is provided in the hollow portion of the output shaft 160.

The rotor shaft 170 is coaxially disposed with the propeller shaft 150 and the output shaft 160, and provided in the hollow portions of the output shaft 160 (i.e., the hollow portions of the speed-increasing gear 12 and the power generation unit 13) and the propeller shaft 150 so as to be fixed to the hub 130a of the propeller 130.

The rotor shaft 170 is formed as the hollow shaft with both ends open. The wiring lines (the power supplying cable 81 and the signal lines 82 and 83, for example) from the propeller 130 are provided in the rotor shaft 170.

The rotor shaft 170 is connected to the rotation unit 151 of the slip ring 15 at the end opposite the end connected to the hub 130a. The position detector 16 according to the first embodiment is connected to the rotor shaft 170 through the rotation unit 151 of the slip ring 15 and the detection shaft 180.

Figure 5:
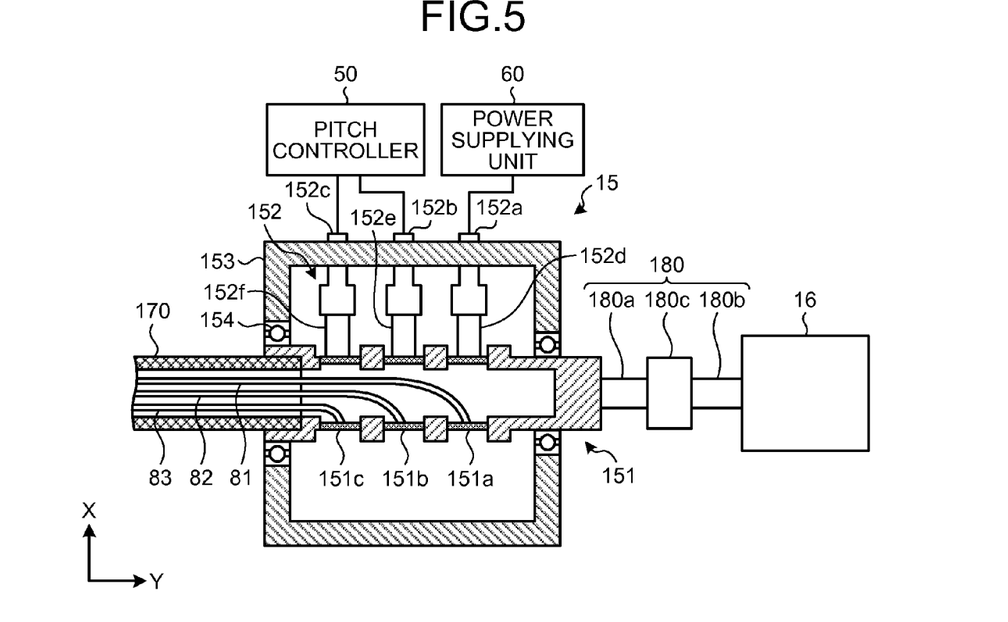
FIG. 5 is a schematic sectional side view of the slip ring.

The connection relationship between the rotor shaft 170 and the position detector 16 is more specifically described below with reference to FIG. 5 and the structures of the slip ring 15 and the detection shaft 180. FIG. 5 is a schematic sectional side view of the slip ring 15.

As illustrated in FIG. 5, the slip ring 15 includes the rotation unit 151, the fixed unit 152, a frame 153, and bearings 154. The frame 153 is fixed to the nacelle 120 by a supporting post (not illustrated), for example.

The rotation unit 151 is a hollow and tubular member having an opening only on a front end side thereof. The rotation unit 151 is connected to the rotor shaft 170 on the front end side and the central axis thereof coincides with the central axis of the rotor shaft 170. The rotation unit 151 is supported by the bearings 154 fixed to the frame 153 in a rotatable manner. As a result, the rotation unit 151 rotates integrally with the propeller 130 and the rotor shaft 170.

The rotation unit 151 is provided with collector rings 151a, 151b, and 151c. The power supplying cable 81, the signal line 82, and the signal line 83 that are provided in the hollow portion of the output shaft 160 are connected to the collector rings 151a, 151b, and 151c, respectively.

The fixed unit 152 includes terminals 152a, 152b, and 152c that are fixed to the frame 153, and brushes 152d, 152e, and 152f provided to the terminals 152a, 152b, and 152c, respectively.

The brushes 152d, 152e, and 152f are held while making contact with the collector rings 151a, 151b, and 151c of the rotation unit 151, respectively. As a result, respective electrical connections between the collector rings 151a, 151b, and 151c and the brushes 152d, 152e, and 152f are also maintained during the rotation of the rotation unit 151. The terminal 152a is connected to the power supplying unit 60 while the terminals 152b and 152c are connected to the pitch controller 50.

In the slip ring 15 thus structured, the rotation unit 151 rotates integrally with the rotor shaft 170 and the propeller 130, and the brushes 152d, 152e, and 152f of the fixed unit 152 make a sliding contact with the collector rings 151a, 151b, and 151c of the rotation unit 151, respectively. As a result, the pitch driving unit 31 and the position detector 32 that are disposed in the propeller 130 (refer to FIG. 3) are electrically connected to the pitch controller 50 and/or the power supplying unit 60.

In FIG. 5, three each of the collector rings, the terminals, and the brushes are provided to the slip ring 15. The numbers of collector rings, terminals, and brushes provided to the slip ring 15 is not limited to those illustrated in FIG. 5.

In this way, one end of the rotation unit 151 of the slip ring 15 is connected to the rotor shaft 170, and the rotation unit 151 rotates integrally with the rotor shaft 170 and the propeller 130.

The other end of the rotation unit 151 is connected to the detection shaft 180 having a smaller shaft diameter than that of the rotor shaft 170. The detection shaft 180 is coaxially disposed with the propeller shaft 150, the rotor shaft 170, and the rotation unit 151.

The detection shaft 180 includes a first shaft 180a, a second shaft 180b, and a shaft coupling 180c. The first shaft 180a is fixed to the rotation unit 151 while the second shaft 180b is fixed to the position detector 16. The first shaft 180a and the second shaft 180b are coaxially coupled with each other by the shaft coupling 180c.

The detection shaft 180 is coaxially disposed with the rotor shaft 170 and the rotation unit 151 in this way, and rotates integrally with the rotation unit 151. The position detector 16 can detect the rotational position of the propeller 130 by detecting the rotational position of the detection shaft 180.

The rotational position of the propeller 130 detected by the position detector 16 is output to the integrated controller 40, and thereafter output to the pitch controller 50 and the power converter 20 by the integrated controller 40.

Referring back to FIG. 1, the power converter 20, the integrated controller 40, and the pitch controller 50 are described. The power converter 20 includes a power conversion unit 21, a conversion controller 22, and an operation unit 23. The power converter 20 is disposed in the tower body 110.

The power conversion unit 21 performs power conversion bi-directionally between the power generation unit 13 of the wind power generation unit 10 and the power system 30. A matrix converter can be used as the power conversion unit 21, for example.

The conversion controller 22 performs power generation control processing, in which the conversion controller 22 outputs a control signal to the power conversion unit 21 to cause the power conversion unit 21 to perform the power conversion on power supplied from the power generation unit 13 to the power system 30. As a result, power generated by the power generation unit 13 is converted from direct current into direct current (DC-DC conversion) by the power conversion unit 21, and the converted power is supplied to the power system 30.

In addition, the conversion controller 22 performs propeller position control processing, in which the conversion controller 22 outputs a control signal to the power conversion unit 21 to cause the power conversion unit 21 to perform the power conversion on power supplied from the power system 30 to the power generation unit 13, and controls the rotational angle of the propeller 130 using the power generation unit 13 as an electrical motor. The propeller position control processing is performed on the basis of operation through the operation unit 23 during replacement of the blade 130b, for example.

That is, the conversion controller 22 produces a control signal such that the rotational position of the propeller 130 coincides with a target position designated by the operation through the operation unit 23 on the basis of the rotational position of the propeller 130 detected by the position detector 16 and the target position. Then, the conversion controller 22 outputs the produced control signal to the power conversion unit 21. As a result, the rotational position of the propeller 130 can be adjusted to coincide with the target position such as a position preliminarily set for each blade 130b as a position for easy attachment and removal of the blade 130b.

In this way, the conversion controller 22 performs the power generation control processing and the propeller position control processing by outputting the control signals to the power conversion unit 21 to cause the power conversion unit 21 to perform the power conversion bi-directionally between the power generation unit 13 and the power system 30.

The wind power generator 1, which includes the integrated controller 40 and the pitch controller 50, performs pitch control processing, in which the pitch angles of the blades 130b are changed to pitch angles depending on the positions of the blades 130b on the basis of the rotational position of the propeller 130 output from the position detector 16. The integrated controller 40 is disposed in the tower body 110, for example. The pitch controller 50 is disposed in the nacelle 120, for example.

The integrated controller 40 acquires the rotational position of the propeller 130 from the position detector 16 and outputs the acquired rotational position to the pitch controller 50. In this way, the rotational position of the propeller 130 detected by the position detector 16 is output to the pitch controller 50 through the integrated controller 40.

Upon acquiring the rotational position of the propeller 130 detected by the position detector 16 through the integrated controller 40, the pitch controller 50 produces a pitch angle change command in accordance with the rotational angle of the propeller 130 for each blade 130b and changes the pitch angle of the blade 130b in accordance with the produced pitch angle change command for each blade 130b.

As described above, the wind power generator 1 according to the first embodiment includes the hollow shaped speed-increasing gear 12, the hollow shaped power generation unit 13, the rotor shaft 170, and the position detector 16.

The speed-increasing gear 12, whose input shaft (the ring 122) and output shaft (the output shaft 160) are coaxially disposed with the propeller shaft 150, increases the rotation of the propeller shaft 150 and outputs the increased rotation. The power generation unit 13, whose input shaft (the output shaft 160) is coaxially disposed with the speed-increasing gear 12, generates power through the output of the speed-increasing gear 12. The rotor shaft 170, which is coaxially disposed with the speed-increasing gear 12 and the power generation unit 13, rotates integrally with the propeller 130 while being provided in the hollow portions of the speed-increasing gear 12 and the power generation unit 13. The position detector 16 detects the rotational position of the propeller 130 by detecting the rotational position of the rotor shaft 170.

That is, in the wind power generator 1 according to the first embodiment, the position detector 16 can be further downsized than in a case in which the position detector 16 detects the rotational position of the propeller shaft 150 because the position detector 16 detects the rotational position of the rotor shaft 170 having a smaller shaft diameter than that of the propeller shaft 150.

In the wind power generator 1 according to the first embodiment, the input shaft (the ring 122) and the output shaft 160 of the speed-increasing gear 12 and the input shaft (i.e., the output shaft 160) of the power generation unit 13 are formed as the hollow shafts, and the rotor shaft 170 is provided in the hollow portions of the speed-increasing gear 12 and the power generation unit 13. As a result, the devices provided in the nacelle 120 can be disposed more compactly. In addition, the rotor shaft 170 can be formed in a straight shape, thereby enabling the central axis of the rotor shaft 170 and the central axis R of the propeller shaft 150 to be readily aligned.

In the first embodiment, the rotor shaft 170 is the hollow member in which the wiring lines from the propeller 130 are provided. Beside the rotor shaft 170, the wind power generator 1 includes the slip ring 15 with one end connected to the rotor shaft 170, and the detection shaft 180 that is connected to the other end of the slip ring 15 and rotates together with the rotor shaft 170. The position detector 16 detects the rotational position of the propeller 130 by detecting the rotational position of the rotor shaft 170 through the detection shaft 180. The detection shaft 180 can be formed to have a smaller shaft diameter than that of the rotor shaft 170, thereby enabling the position detector 16 to be further downsized.

The position detector 16 according to the first embodiment is disposed rearmost on the devices provided in the nacelle 120 as exemplarily illustrated in FIG. 2. This disposition enables the position detector 16 to be readily attached, removed, or subjected to maintenance.

The rotor shaft 170 can more directly transmit the rotation of the propeller 130 because the rotor shaft 170 is provided to the propeller 130.

In the first embodiment, the rotor shaft 170 is provided to the propeller 130. However, the rotor shaft 170 is not always required to be directly connected to the propeller 130.

Figure 6:
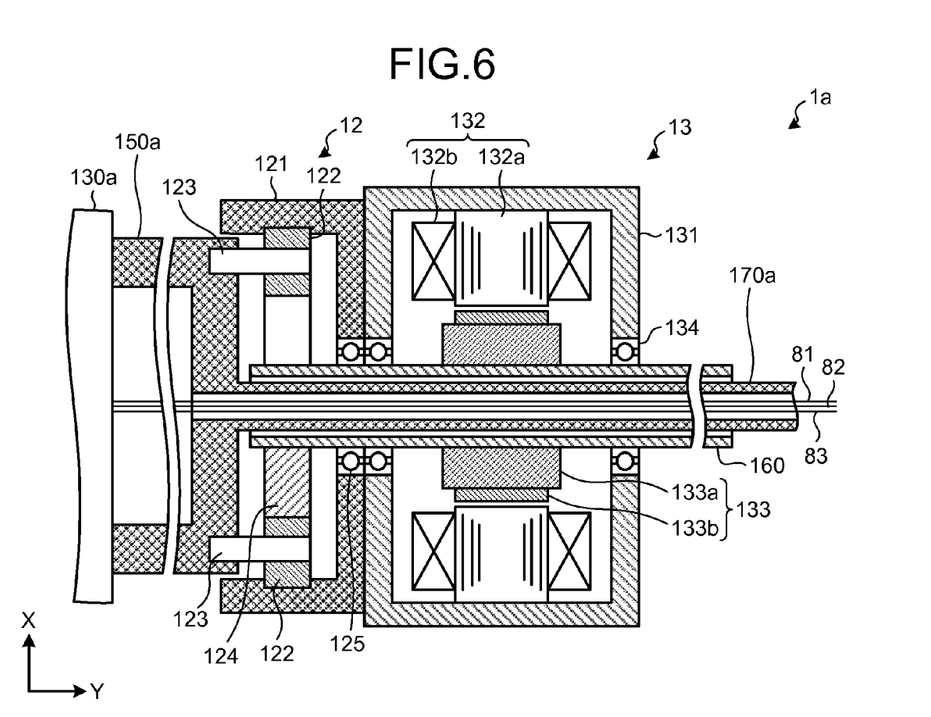
FIG. 6 is a schematic sectional side view illustrating another structure of a rotor shaft.

In a second embodiment, an example where the rotor shaft 170 and the propeller 130 are indirectly connected is described with reference to FIG. 6. FIG. 6 is a schematic sectional side view illustrating another structure of the rotor shaft 170. In the following description, the same components described in the first embodiment are labeled with the same reference numerals and duplicated descriptions thereof are omitted.

As illustrated in FIG. 6, in a wind power generator 1a according to the second embodiment, a rotor shaft 170a is provided to a propeller shaft 150a. The propeller shaft 150a and the rotor shaft 170a may be integrally formed or may be connected after they are individually formed.

The rotor shaft 170a is coaxially disposed with the propeller shaft 150a and connected to the front end of the slip ring 15 in the same manner as the rotor shaft 170 according to the first embodiment. The rotor shaft 170a is formed as a hollow shaft. The wiring lines (the power supplying cable 81 and the signal lines 82 and 83) from the hub 130a are provided in the hollow portions of the propeller shaft 150a and the rotor shaft 170a, and are connected to the rotation unit 151 of the slip ring 15.

In this way, the rotor shaft 170a may be connected to the propeller 130 through the propeller shaft 150a. In this case, the rotor shaft 170a also rotates integrally with the hub 130a of the propeller 130. As a result, the position detector 16 can detect the rotational position of the propeller 130 by detecting the rotational position of the rotor shaft 170a in the same manner as the first embodiment.

The wind power generator 1a according to the second embodiment in which the rotor shaft 170a is provided to the propeller shaft 150a enables the propeller shaft 150a and the rotor shaft 170a to be readily coaxially aligned with each other.

The rotor shaft is not limited to being connected as illustrated in FIG. 6. The rotor shaft may be fixed to both the propeller and the propeller shaft, or provided to the propeller or the propeller shaft though a member provided to the propeller or the propeller shaft.

In the above-described embodiments, the rotor shaft serves as the shaft from which the wiring lines from the propeller are taken out to be connected to the rotation unit of the slip ring. The rotor shaft, however, may serve as a member exclusively used for transmitting the rotation of the propeller to the position detector.

Figure 7:
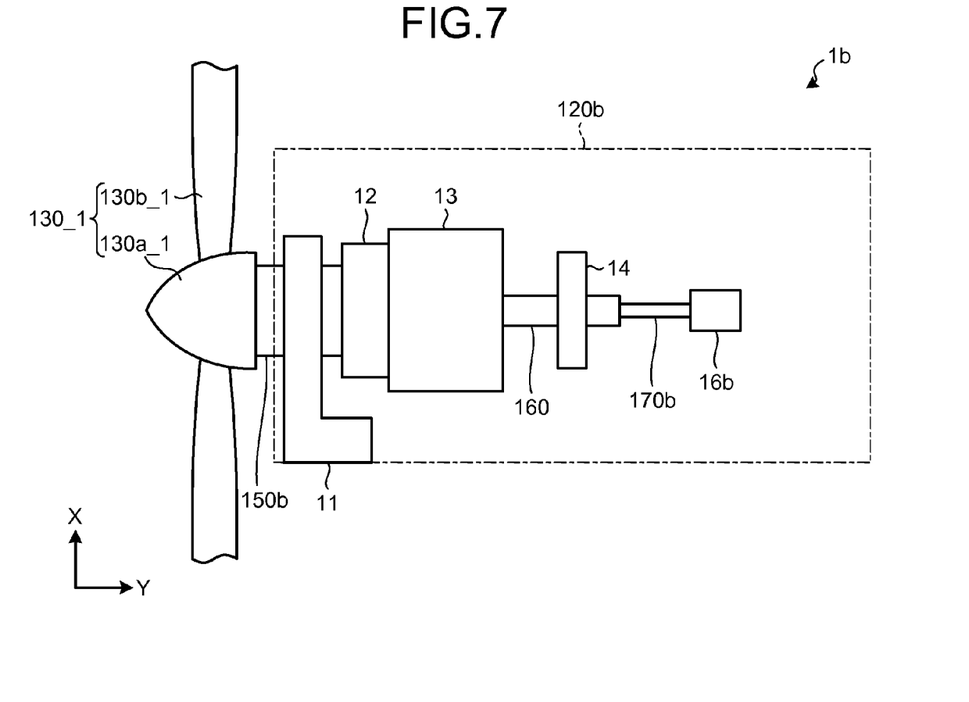
FIG. 7 is a schematic side view illustrating another structure of the devices disposed in the nacelle.

Such a case is described below with reference to FIG. 7. FIG. 7 is a schematic side view illustrating another structure of the devices disposed in the nacelle 120.

As illustrated in FIG. 7, a wind power generator 1b according to a third embodiment differs from the wind power generator 1 according to the first embodiment in that the slip ring 15 is not disposed in a nacelle 120b. That is, in the wind power generator 1b, blades 130b_1 are attached to a hub 130a_1 at fixed pitch angles or the pitch angles of the blades 130b_1 can be controlled by wireless communications, for example.

When the latter structure is employed, driving power of the pitch driving unit disposed in the hub 130a_1 may be supplied from solar panels that are attached to the blades 130b_1 and generate power, for example.

A rotor shaft 170b according to the third embodiment is coaxially disposed with the speed-increasing gear 12 and the power generation unit 13, and rotates integrally with a propeller 130_1 while being provided in the hollow portions of the speed-increasing gear 12 and the power generation unit 13. The rotor shaft 170b may be provided to the hub 130a_1 in the same manner as the rotor shaft 170 according to the first embodiment or may be provided to a propeller shaft 150b in the same manner as the rotor shaft 170a according to the second embodiment.

A position detector 16b according to the third embodiment is connected to the rotor shaft 170b. The position detector 16b detects the rotational position of the propeller 130_1 by detecting the rotational position of the rotor shaft 170b.

In the wind power generator 1b according to the third embodiment, the position detector 16b is directly connected to the rotor shaft 170b without the slip ring 15 and the detection shaft 180 interposed therebetween. As a result, the rotational position of the propeller 130_1 can be detected with higher accuracy.

The rotor shaft 170b according to the third embodiment is not required to be formed as a hollow shaft unlike the rotor shafts 170 and 170a according to the first and the second embodiments because the wiring lines from the propeller 130_1 are not required to be provided in the rotor shaft 170b. When the rotor shaft 170b is formed as a solid shaft, the shaft diameter of the rotor shaft 170b can be further reduced than when the rotor shaft 170b is formed as a hollow shaft while the strength of the rotor shaft 170b is maintained. As a result, the position detector 16b can be downsized.

"Coaxially" is not strictly necessary. That is, these shafts may have slightly offset from each other. The same shall apply hereinafter. "Hollow shape" is not limited to the shape shown in the embodiment. The same shall apply hereinafter.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power generator, comprising:
a hollow shaped speed-increasing gear whose input shaft and output shaft are coaxially disposed with a propeller shaft to which a propeller is connected, and coupled to the propeller shaft;
a hollow shaped power generation unit whose input shaft is coaxially disposed with the speed-increasing gear, the hollow shaped power generation unit generating power through the output of the speed-increasing gear;
a rotor shaft that is coaxially disposed with the speed-increasing gear and the power generation unit and rotates integrally with the propeller, the rotor shaft passing through hollow portions of the speed-increasing gear and the power generation unit, the rotor shaft of which one end is provided to the propeller or the propeller shaft and of which the other end protrudes from a side of the power generation trait of the hollow portions of the speed-increasing gear and the power generation unit;
a position detector that is disposed at a position farther from the propeller than the power generation unit on an axial line of the rotor shaft, and is directly or indirectly connected to the other end of the rotor shaft, and detects a rotational position of the propeller by detecting a rotational position of the rotor shaft;

a slip ring whose one end is connected to the rotor shaft; and a detection shaft that is provided to the other end of the slip ring and rotates together with the rotor shaft, wherein in the rotor shaft, a wiring line from the propeller is provided, and the position detector detects the rotational position of the rotor shaft through the detection shaft, and wherein the detection shaft comprises:
 a first shaft that is fixed to the slip ring;
 a second shaft that is fixed to the position detector; and
 a shaft coupling that connects the first shaft with the second shaft.

2. The power generator according to claim 1, wherein the position detector is connected to the other end of the rotor shaft.

3. The power generator according to claim 2, wherein the power generation unit and the speed-increasing gear are integrally formed.

4. The power generator according to claim 2, wherein the speed-increasing gear is a planetary gear.

5. The power generator according to claim 1, wherein the position detector is disposed rearmost.

6. The power generator according to claim 5, wherein the power generation unit and the speed-increasing gear are integrally formed.

7. The power generator according to claim 5, wherein the speed-increasing gear is a planetary gear.

8. The power generator according to claim 1, wherein the power generation unit and the speed-increasing gear are integrally formed.

9. The power generator according to claim 8, wherein the speed-increasing gear is a planetary gear.

10. The power generator according to claim 1, wherein the speed-increasing gear is a planetary gear.

11. The power generator according to claim 1, wherein the detection shaft has a smaller shaft diameter than that of the rotor shaft.

12. The power generator according to claim 1, wherein the detection shaft is solid.

13. The power generator according to claim 1, wherein the output shaft of the speed-increasing gear protrudes from the side of the power generation unit of the hollow portions, and the power generator further comprises a break that is provided to a position farther from the propeller than the power generation unit on the output shaft of the speed-increasing gear protruding from the side of the power generation unit of the hollow portions, and stops rotation of the output shaft of the speed-increasing gear.

14. A power generator, comprising:
 a hollow shaped speed-increasing gear whose input shaft and output shaft are coaxially disposed with a propeller shaft to which a propeller is connected, and coupled to the propeller shaft;
 a hollow shaped power generation unit whose input shaft is coaxially disposed with the speed-increasing gear, the hollow shaped power generation t generating power through the output of the speed-increasing gear;
 a rotor shaft that is coaxially disposed with the speed-increasing gear and the power generation unit and rotates integrally with the propeller, the rotor shaft passing through hollow portions of the speed-increasing gear and the power generation unit, the rotor shaft of which one end is provided to the propeller or the propeller shaft and of which the other end protrudes from a side of the power generation unit of the hollow portions of the speed-increasing gear and the power generation unit; and
 a position detecting means that is disposed at a position further from the propeller than the power generation unit on an axial line of the rotor shaft, and is directly or indirectly connected to the other end of the rotor shaft, and detects a rotational position of the propeller by detecting a rotational position of the rotor shaft;
 a slip ring whose one end is connected to the rotor shaft; and
 a detection shaft that is provided to the other end of the slip ring and rotates together with the rotor shaft, wherein
 in the rotor shaft, a wiring line from the propeller is provided, and
 the position detecting means detects the rotational position of the rotor shaft through the detection shaft, and
 wherein the detection shaft comprises:
  a first shaft that is fixed to the slip ring;
  a second shaft that is fixed to the position detecting means; and
  a shaft coupling that connects the first shaft with the second shaft.

* * * * *